United States Patent [19]

Fransson et al.

[11] Patent Number: 4,954,092
[45] Date of Patent: Sep. 4, 1990

[54] ELECTRICAL CONTACT UNIT

[75] Inventors: Rolf G. Fransson, Angered; Bertil E. Jansson, deceased, late of Askim; Magnus Jannson, Administrator, Jönköping, all of Sweden

[73] Assignee: Victor Hasselblad Aktiebolag, Göteborg, Sweden

[21] Appl. No.: 244,904

[22] Filed: Sep. 15, 1988

[30] Foreign Application Priority Data

Sep. 15, 1987 [SE] Sweden .................. 8703553

[51] Int. Cl.$^5$ .................................. G03B 17/14
[52] U.S. Cl. ................................ 439/152; 354/286
[58] Field of Search ............... 439/143, 145, 152, 680, 439/338, 341, 342, 376; 354/286, 289.12, 485, 486

[56] References Cited

U.S. PATENT DOCUMENTS

| 4,440,484 | 4/1984 | Komoto et al. | 354/286 |
| 4,637,704 | 1/1987 | Ishimura et al. | 354/286 |
| 4,748,467 | 5/1988 | Mackawa et al. | 354/286 |
| 4,769,665 | 9/1988 | Dazborn | 354/286 X |

FOREIGN PATENT DOCUMENTS 0064500 11/1968 German Democratic Rep. ..................... 439/145

Primary Examiner—Z. R. Blinsky

[57] ABSTRACT

An electrical contact unit electrically connects a first main member, e.g., a camera housing, with a second main member, e.g., a camera lens, which is mountable on the first main member. The first main member is provided with a contact cradle, which has first electrical contacts, e.g. pins, and a rolling or sliding member. The contact cradle is rotatably mounted on a cradle axle. The second main member is provided with second electrical contacts and a receiving recess. When the second main member is in a first mounting position, it presses against the rolling or sliding member so that the contact cradle assumes a retracted position, in which none of the first electrical contacts are in contact with the second main member. When the second main member is in a second mounting position, the rolling or sliding member is located in the receiving recess so that the contact cradle assume a contact position, in which each of the first electrical contacts is in contact with a corresponding one of the second electrical contacts. The second main member moves from the first mounting position to the second mounting position and vice versa by the main members being rotated relative to one another.

9 Claims, 6 Drawing Sheets

ELECTRICAL CONTACT UNIT

BACKGROUND OF THE INVENTION

Every time electrical current is to be passed from one part of an apparatus to another, separate part, some form of contact unit is needed. Probably the most well known type of electrical contact includes a base from which two or three elongated, parallel, electrically conductive pins extend. The pins constitute male contacts which mate with female contacts. Such contacts are used in most common household machines, the female contacts being located in a wall socket.

It is not necessary for a contact unit to have male contacts in the shape of protruding pins. Electronic circuit boards which are to be mounted in, e.g., computers, are often provided with narrow, parallel contact surfaces. These contact surfaces are arranged along one edge of the circuit board, the part of the printed circuit on which the contact surfaces are provided itself forming a male member, which is inserted in a contact unit which forms a female member and which is mounted on the inside of the casing of the computer.

The aforesaid types of contacts presuppose that the male member of the contact unit is guided generally in a straight line when inserting it into the female member. The direction in which it is guided is the same as the longitudinal direction of the elongated pins or the contact surfaces. It is not possible to use such types of contacts if the male member, when it is brought into contact with the female member, must move in a direction which is not parallel to the longitudinal direction of the male member. Transverse motion of contact units provided with fixedly mounted pins is not even possible, and transverse motion of the aforesaid contact surfaces on a circuit board can cause the surfaces to be damaged or even torn off.

In many modern system cameras it is necessary to convey electric current between the camera housing and removable parts, such as a lens, which are to be mounted on the housing. If the lens is removable it and the camera housing must be provided with some form of electrical contact arrangement. The lens is usually mounted on the camera housing using some rotational motion, and the contact arrangement must be such that it can accommodate this motion.

One way to solve this problem is to arrange sliding contacts in the lens mounting. Such contacts are, however, subjected to friction every time the lens is mounted and this causes increased wear. This usually prohibits the use of precious metals, for example, gold plating of contact surfaces. It is furthermore necessary to insure that the contact surfaces are kept clean.

A more satisfactory arrangement of the contact unit can be achieved by mounting the lens using a locking ring. In this case it is not necessary for the lens itself to be rotated, but rather it may be mounted by holding it against the camera housing while the locking ring is turned. Such a solution makes it possible to convey electric current by means of pins, which constitute male contacts, and which are provided on the camera housing; corresponding female contacts are, in this case, provided on the lens. However, such an arrangement requires the user to be very careful when mounting the lens in order to avoid damaging the pins, especially if there are several pins. It is furthermore not possible to mount other types of lenses without risking damage to the pins.

The object of the present invention is to provide an electrical contact unit by means of which the aforesaid disadvantages may be eliminated.

SUMMARY OF THE INVENTION

The present invention provides an electrical contact unit for electrically connecting a first main member with a second main member.

According to the invention, the first main member exhibits a generally planar first supporting surface and the second main member exhibits a generally planar second supporting surface.

The first main member includes a contact cradle, which exhibits a generally planar upper cradle surface, carries first electrical contacts, and is provided with a rolling or sliding member, which extends from the cradle surface. The second main member carries second electrical contacts and is provided with a receiving recess. The contact cradle is rotatably journalled on a cradle axle.

Further according to the invention, the second main member assumes two mounting positions, a first and a second, and it moves from the first mounting position to the second mounting position and vice versa by the two main members being rotated relative to one another.

In the first mounting position, the first supporting surface is parallel to and is located immediately adjacent to the second supporting surface, and the rolling or sliding member lies against the second supporting surface. The contact cradle thereby assumes a retracted position, in which none of the first electrical contacts is in physical contact with the second main member.

In the second mounting position, the first supporting surface is parallel to and is located immediately adjacent to the second supporting surface, the rolling or sliding member being located in the receiving recess. The contact cradle thereby assumes a contact position, in which each of the first electrical contact is in contact with a corresponding one of the second electrical contacts.

BRIEF DESCRIPTION OF THE DRAWINGS

A preferred embodiment of the contact unit in accordance with the present invention will now be described with reference to the drawings, in which.

DESCRIPTION OF THE PREFERRED EMBODIMENT

Figure 1:
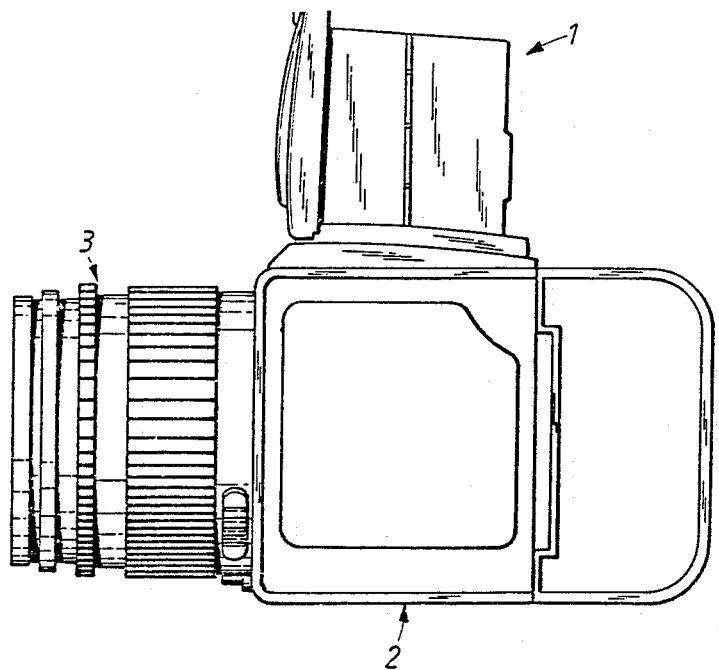
FIG. 1 shows a side view of a camera.

FIG. 1 shows a camera 1, which comprises a camera housing 2 and a lens 3. In FIG. 1 the lens 3 is mounted on the camera housing 2, but the lens may be removed, for example, in order to change to a different lens.

Figure 3:
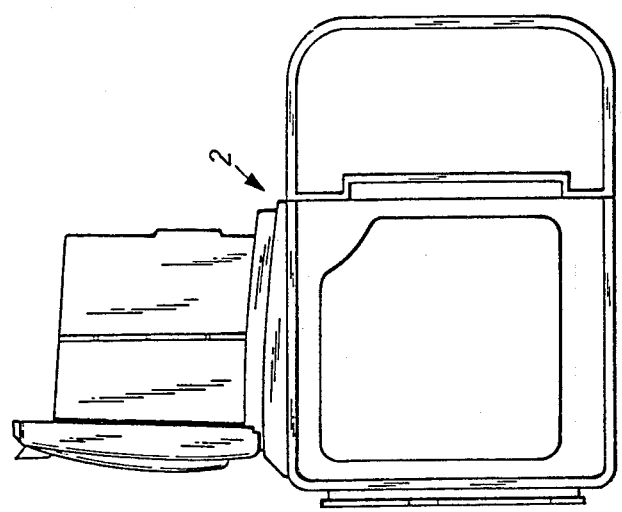
FIG. 3 shows a side view of a camera housing.
Figure 2:
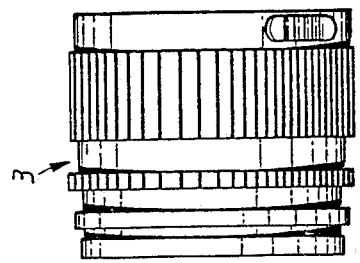
FIG. 2 shows a side view of a lens.

FIGS. 2 and 3 show the lens 3 and the camera housing 2, respectively, separately. A number of first electrical conductors (not shown) are provided in the camera housing 2, all or some of which are to be brought into electrical contact with corresponding second electrical conductors (not shown), which are provided in the lens 3. Such electrical conductors may for example be conductors for conveying supply voltage, a ground conductor, and conductors for conveying digital or analog electrical signals.

In the preferred embodiment the lens 3 is mounted on the camera housing 2 by means of a bayonet mount. The general appearance and function of such a bayonet mount are well-known, but for the sake of understanding the present invention, the most essential parts of a bayonet mount will be described below.

An axial direction is defined as the direction of the optical axis of the lens 3. A line which extends in the axial direction is normal to the plane of FIGS. 4 and 5. A radial direction is defined as the direction of each vector which proceeds from the optical axis and is perpendicular to it.

Figure 4:
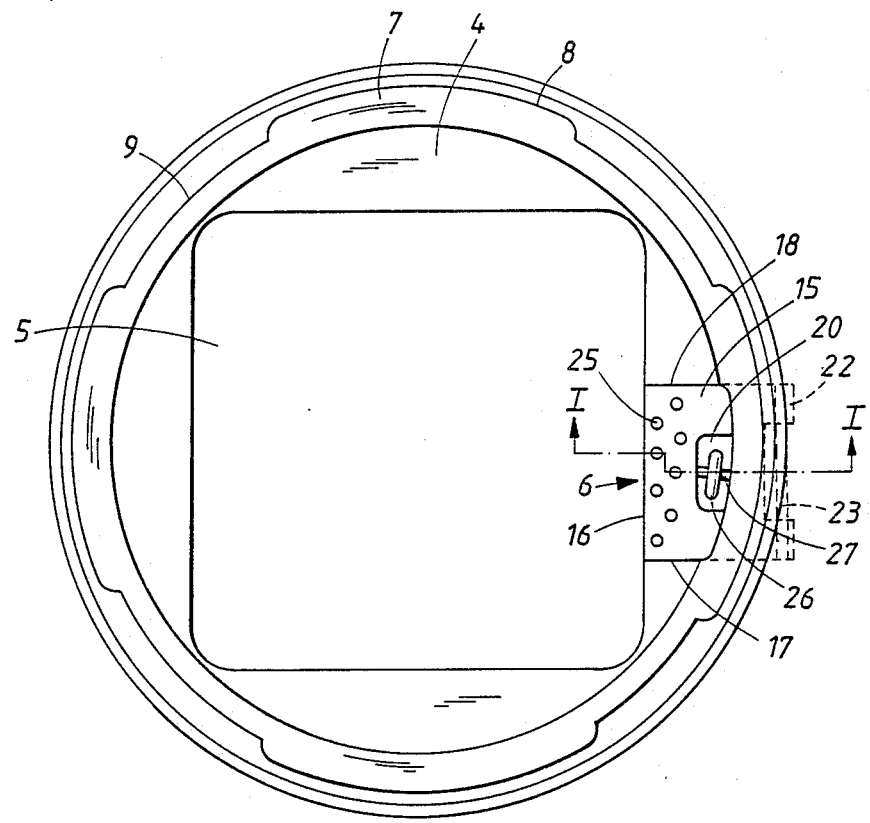
FIG. 4 shows a front view of a section of the camera housing.

As is seen in FIG. 4, the camera housing 2 is provided with a mainly flat supporting plate 4, which may be arranged as a section of the camera housing 2 or as an element which is mounted on the camera housing 2. The supporting plate 4 exhibits a mainly four-sided opening 5. A contact cradle 6 is provided in a cut-out section of the supporting plate 4. An inner mounting ring 7 is mounted on the supporting plate 4. An outer mounting ring 8 encircles and partially covers the inner mounting ring 7. The mounting rings 7 and 8 are concentric about the optical axis.

The outer mounting ring 8 is provided with a number of projections 9, which are distributed around the periphery of the outer mounting ring 8, and which extend inward in the radial direction. The projections 9 are located at a distance, in the axial direction, from the inner mounting ring 7.

Figure 5:
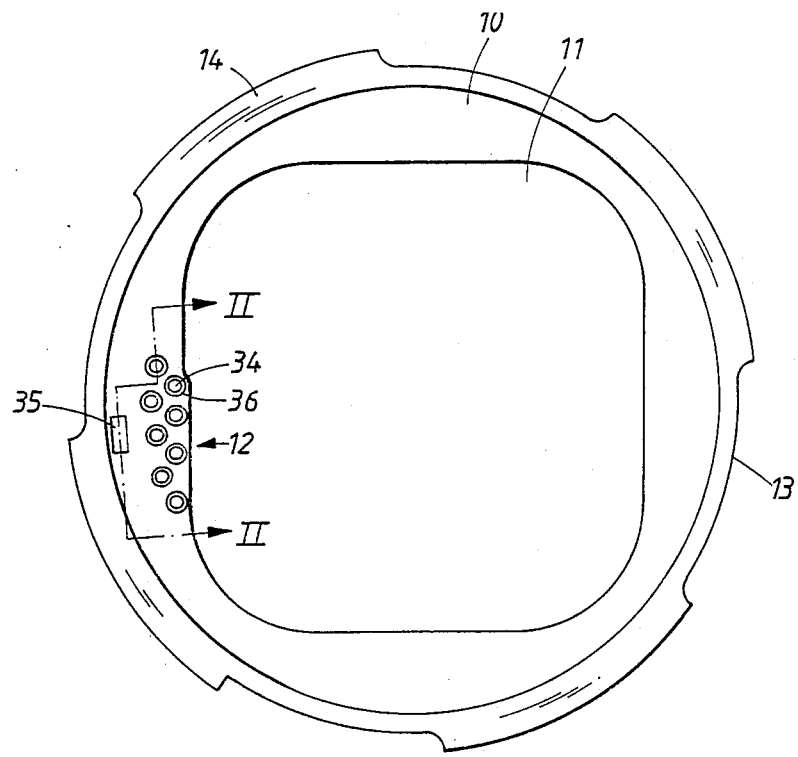
FIG. 5 shows a view of the mounting end of the lens.

As is seen in FIG. 5, the lens 3 is provided with a generally flat supporting plate 10, which may be arranged as a section of the lens 3 or as an element which is mounted on the lens 3. The supporting plate 10 exhibits a mainly four-sided opening 11 and a female contact member 12. A lens mounting ring 13 encircles the supporting plate 10. The lens mounting ring 13 is concentric with the said inner mounting ring 7 and is provided with a number of projections 14, which extend outward in the radial direction. In the example shown, the number of projections 14 on the lens mounting ring 13 is equal to the number of projections 9 on the outer mounting ring 8.

The lens 3 is mounted on the camera housing 2 by moving it towards the camera housing so that the projections 14 come to lie against the inner mounting ring 7 and so that each projection 14 is located between two of the projections 9. The lens 3 is then rotated until it assumes a mounted position, in which continued rotation is prevented by a stopper (not shown). In this mounted position each of the projections 14 is located between the inner mounting ring 7 and a corresponding one of the projections 9. The distance between each projection 9 and the inner mounting ring 7 is somewhat less than the thickness of the lens mounting ring 13, and thus of the projections 14, so that the lens 3 is friction locked onto the camera housing 2. When the lens 3 is mounted on the camera housing 2 in this manner the lines which define the mainly straight edge portions of the opening 5, are parallel to the lines which define the mainly straight edge portions of the opening 11. This method of mounting a lens on a camera housing is characteristic for the use of a bayonet mount and is well known.

The contact cradle 6 will now be described with reference to FIGS. 4, 6, 7 and 8. The contact cradle 6 comprises a mainly plate-like rectangular base 15. The base 15 exhibits a generally planar inner side surface 16 and generally planar side surfaces 17 and 18. As is seen in FIG. 4, the inner side surface 16 is preferably flush with the one edge of the opening 5. A roller recess 20 is provided in the base 15. The base 15 extends under the inner mounting ring 7. That portion of the base 15, which lies under the inner mounting ring 7, viewed as in FIG. 6, constitutes an arm 21, which, in the example shown, is less thick than the portion of the base 15 which is located within the inner mounting ring 7. The arm 21 includes a number of bearing portions 22, provided with holes, as will be described in more detail below. An axle 23 extends through the bearing portions 22. The axle 23 is preferably anchored in the camera housing 2 or in the outer mounting ring 8. The arm 21, and thus the entire contact cradle 6, can rotate about the axle 23. The construction and function of the arm 21 and of the axle 23 will be described more clearly below.

The base 15, the arm 21, and the bearing portions 22 are preferably manufactured of an electrically insulating material as a single unit.

A number of holes 24 are provided through the base 15. Each of the holes 24 receives a corresponding first electrical contact element 25, which is preferably a pin or some other male element. The holes 24 and the pins 25 will be described in greater detail below.

The contact cradle 6 according to the present invention further includes a roller 26, which is mounted on and can rotate about an axle 27. The axle 27 extends mainly in the radial direction. The ends of the axle 27 are anchored or mounted in bearings in the base 15 so that at least half of the roller 26 lies within the roller recess 20.

Figure 8:
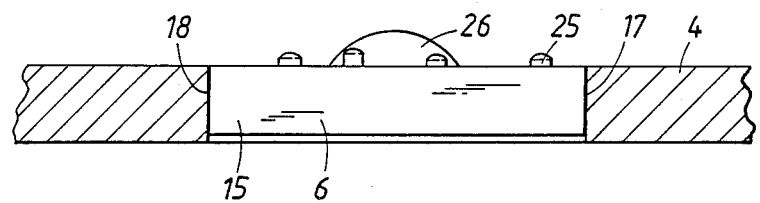
FIG. 8 shows an end view of a contact cradle.

FIG. 8 shows that end of the contact cradle 6 which is flush with the mainly straight edge of the opening 5. The thickness of the contact cradle 6 is approximately equal to the thickness of the supporting plate 4. It is further seen that the pins 25 extend out from the base 15. The roller 26 also extends out from the base 15, its outward extension being greater than that of the pins 25.

According to FIG. 4, the number of pins 25 provided in the contact cradle 6 is eight. It is to be emphasized, however, that this number has been chosen only by way of example and that the present invention makes it possible to choose the number of pins arbitrarily.

As is seen in FIG. 4, the roller recess 20, and thus also the roller 26, are arranged closer to the bearing portions 22 and the axle 23 than any of the pins 25.

The arrangement of the electrically conducting pins 25 in the holes 24 in the base 15 will now be described with reference to FIG. 6. Each of the holes 24 consists preferably of a first, cylindrical hole 28 and a second, cylindrical hole 29. The first hole 28 and the second hole 29 are concentric.

Each of the pins 25 has a rounded end 40 and is provided with a stopping collar 30. Each pin 25 and corresponding stopping collar 30 may be manufactured as a single unit, or as separate elements, in which case the stopping collar 30 is mounted on the corresponding pin 25.

The diameter of the first holes 28 is approximately equal to the outer diameter of the pins 25, and is less than the diameter of the second holes 29, the diameter of which is approximately equal to the greatest diameter of the stopping collar 30. Each of the pins 25 is mounted in the corresponding hole 24 in the base 15 by putting the rounded end 40 in the corresponding second hole 29, and then into the corresponding first hole 28, until further insertion of the pin 25 in the corresponding hole 24 is prevented by the stopping collar 30. This position of the pin 25 defines its fully inserted position.

A spring 37 is provided in each of the second holes 29. Each spring 37 is pretensioned so that it strives to hold the corresponding pin 25 in its fully inserted position. This is done, for example, by the one end of the spring 37 lying against the corresponding stopping collar 30 of the pin 35, while its other end lies against a retaining plate 38, which is mounted securely on the base 15.

Pin holes 39 are made in the retaining plate 38, and one of the pins 25 extends through each of the pin holes 39. The diameter of the pin holes 39 is approximately equal to the diameter of the pins 25, but is less than the inner diameter of the corresponding spring 37; thus, wobbling of the pins 25 in the holes 24 is prevented. Providing the springs 37 does however enable a certain longitudinal motion of the pins 25 in the holes 24, whereby the springs 37 seek to return each pin 25 to the fully inserted position. This is seen most clearly in FIG. 7.

Figure 7:
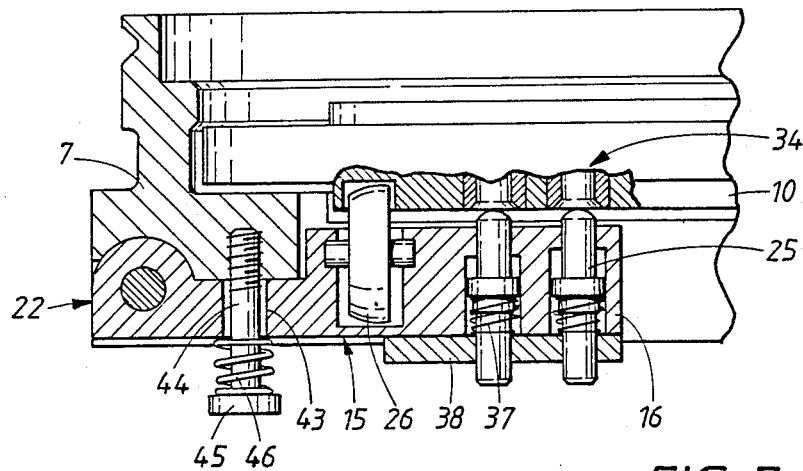
FIG. 7 shows a sectional view along the line I—I in FIG. 4 of the contact unit in a second position.

As is seen in FIG. 7, it is not necessary that all of the pins 25 be inserted into the base 15 to the same depth, but rather certain ones of the pins 25 may be allowed to extend farther out from the base 15 than others, even when all of the pins 25 are in the fully inserted position. The reason for and the advantages of this will be described below.

Figure 6:
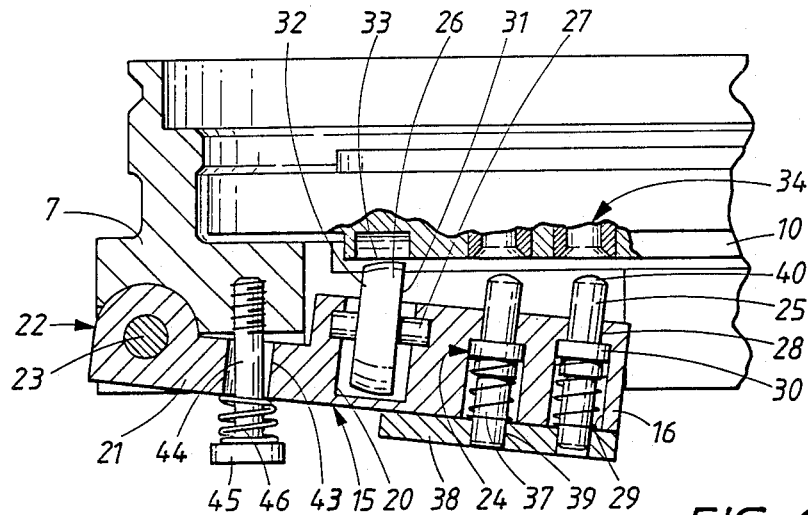
FIG. 6 shows a sectional view along the line I—I in FIG. 4 of a contact unit in a first position.

The shape of the roller 26 is seen most clearly in FIG. 6. The roller 26 exhibits a mainly planar, circular inner surface 31 and a mainly planar circular outer surface 32. The inner surface 31 is located closer to the pins 25 than the outer surface 32. In the illustrated example the inner surface 31 has a larger outer diameter than the outer diameter of the outer surface 32. The roller 26 also exhibits a rolling surface 33.

As is seen in FIG. 7, a hole 43 is provided in the arm 21. A screw 44 or other similar element extends through the hole 43. One end of the screw 44 is anchored, e.g., in one of the mounting rings 7 or 8, and, at its other end, it exhibits a head 45. A spring 46 is arranged on the screw 44, one end of the spring 46 lying securely against the arm 21, and the other end lying securely against the head 45. The spring 46 is pretensioned in such a way that it presses the arm 21 against the inner mounting ring 7, i.e., it strives to return the contact cradle 6 from a first position, which is shown in FIG. 6, to a second position, which is shown in FIG. 7.

The female contact member 12 of the lens 3 will now be described with reference to FIGS. 5 and 9. As is seen in FIG. 5, the female contact member 12 comprises a number of electrically conductive female contacts 34. In the illustrated example, each female contact 34 consists of a contact head 41 and a connecting portion 42; each female contact 34 is, however, preferably manufactured as a single unit. A mainly cylindrical recess 35 is made in the female contact member 12, which is provided in a portion of the supporting plate 10. The female contacts 34 and the cylindrical recess 35 are located in such a way that, when the lens is in the mounted position on the camera housing, as was described above, the cylindrical recess 35 in the supporting plate 12 is located immediately adjacent to the roller recess 20 in the supporting plate 4, and each of the female contacts 34 is located immediately adjacent to one of the pins 25.

Figure 9:
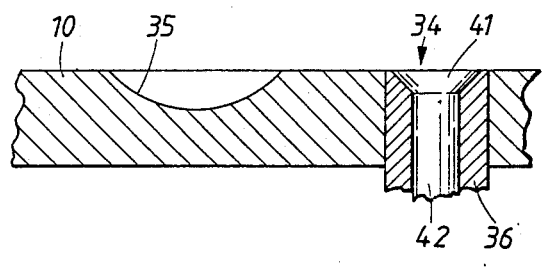
FIG. 9 shows a sectional view along the line II—II in FIG. 5 of a female contact member.

FIG. 9 shows a sectional view of the female contact member 12, viewed along the line II—II in FIG. 5. Electrically insulating sleeves 36 surround each of the female contacts 34, and each insulating sleeve 36 is securely mounted in the supporting plate 10 of the lens 3. The contact heads 41 are preferably flush with the supporting plate 10.

Each of the aforesaid first electrical conductors, which belong to the camera housing, are connected by means of, e.g., soldering, with the corresponding pins 25. Each of the aforesaid second electrical conductors, which belong to the lens, and which are to be brought into electrical contact with the corresponding first electrical conductors, which belong to the camera housing, are connected by means of, e.g., soldering, with the connection portion 42 of the corresponding female contact 34. This means that when the pins 25 are in physical contact with the corresponding female contacts 34, the electrical conductors in the camera housing and in the lens are electrically connected to one another.

The greatest depth of the cylindrical recess 35, as shown in FIG. 9, is approximately equal to the distance the roller 26 extends out from the plate-shaped base 15. The curvature of the cylindrical recess 35 is less than or equal to the curvature of the roller 26 where its diameter is greatest.

When the lens 3 is mounted on the camera housing 2 its supporting plate 10 is located immediately adjacent to or lies against the supporting plate 4. Since that surface of the base 15, from which the roller 26 extends, lies in approximately the same plane as the supporting plate 4, the roller 26 will be in physical contact with the supporting plate 10.

The functioning of the contact unit according to the present invention will now be described with reference primarily to FIGS. 6 and 7. As has been described above, the lens 3 is mounted on the camera housing 2 by means of a rotational motion. When the lens is first brought against the camera housing 2, and during most of the rotational motion, the supporting plate 10 will push against the roller 26 so that the contact cradle 6 is forced to rotate about the axle 23, whereupon the contact cradle 6 assumes the first position, which is illustrated in FIG. 6. During the rotational motion, the roller 26 will roll on the supporting plate 10. When the contact cradle 6 is in the first position, no part or portion of the contact cradle 6 other than the roller 26 is in physical contact with any part or portion of the lens 3.

When the lens 3 approaches the correct mounting position on the camera housing 2, the cylindrical recess 35 in the supporting plate 10 of the lens will begin to approach the roller 26.

When the cylindrical recess 35 is adjacent to the roller 26, the roller 26 rolls down into it under the influence of the returning force of the spring 46. The contact cradle 6 thus rotates about the axle 23 to assume the second position, which is illustrated in FIG. 7. The contact cradle 6 thus assumes the second position only when the lens 3 is in the correct mounted position on the camera housing 2. When the contact cradle 6 assumes the second position, each of the pins 25 is pressed against the contact head 45 of the corresponding female contact 34 by the spring force of the springs 37 as well as of the spring 46.

Upon removal of the lens 3, i.e., when the lens is rotated so that the cylindrical recess 35 is no longer located directly opposite the roller 26, the contact cradle 6 will assume the said first position until the lens is completely removed from the camera housing 2. It is to be observed that the second position of the contact cradle 6 constitutes a resting position, which the contact cradle 6 assumes when no lens is mounted on the camera housing. Continued counterclockwise rotation of the contact cradle 6, viewed as in FIG. 7, is prevented by the arm 21 coming to lie against the inner mounting ring 7. This stopping action could also be brought about by providing the contact cradle 6 with projecting stopper portions, which, in the second position, fit into corresponding notches in, e.g., the supporting plate 4. It is obvious that the contact cradle 6 could be caused to move from the one abovementioned position to the other by providing the base 15 with a projecting, non-rolling portion instead of the roller 26. Arranging the roller 26 on the axle 27, as has been described above is, however, preferred, since it causes less wear due to friction.

The contact cradle 6 moves smoothly from the first position to the second position and vice versa, so that the rounded ends 40 of the pins 25 are brought into physical contact with the corresponding female contacts 34 just before the lens 3 assumes the correct mounted position. This means that some frictional cleaning of the rounded ends 40 and of the female contacts 34 is accomplished just before the lens 3 assumes the correct mounted position. This brief frictional cleaning contributes to better electrical contact.

By varying the depth at which the pins 25 are inserted in the base 15, i.e., by arranging the pins 25 so that they extend different distances out from the base 15, it is possible to arrange the contact unit so that certain ones of the pins come into electrical contact with their corresponding female contacts 34 earlier than others. In several applications, especially applications which involve digital integrated circuits, it is important to secure the connection between the electrical ground conductors and the conductors for supply voltage before other electrical contacts are made.

As will be understood from the description above, the camera user is not directly responsible for accurate insertion of the pins 25 when they are brought into contact with the female contacts 34, but rather this is seen to by the unique arrangement of the contact unit according to the present invention. The danger that the pins 25 will be damaged when mounting the lens 3 is therefore minimized. Since even the friction to which the pins 25 are subjected when mounting the lens 3 on the camera housing 2 is minimal, the electrical contact surfaces included may be manufactured or encased in precious metals, especially gold, which in turn minimizes the danger of corrosion and guarantees the best possible electrical contact.

An additional advantage of the contact unit according to the present invention is that lenses which are not to be brought into electrical contact with the camera housing 2 may also be mounted on the camera housing and used without regard to the contact cradle 6. Since such a lens would lack the cylindrical recess 35, the contact cradle 6 would never assume the said second position, so that there is no risk of damaging the contact cradle 6. This means that the camera user may also mount lenses which are not provided with the female contact member 12 as described above, without risking damage to the contact cradle 6 and in particular to the pins 25. Considering that which has been described above it should now be obvious that the contact unit according to the present invention achieves all of its stated objectives.

Many possible deviations from the described embodiment have been mentioned above. Other deviations are also conceivable. Other springs or returning elements than those described could, for example, be used. It is even conceivable that the contact cradle 6 could be provided in the lens 3 instead of in the camera housing 2, but the disadvantages of such a choice should be obvious. The contact unit according to the present invention could also be used for arranging electrical contact between two objects whose relative motion during mounting is linear instead of rotational, and the contact unit is of course usable in other contacts than that of mounting a lens on a camera housing.

All of these deviations from the preferred embodiment are however naturally encompassed by the following claims.

We claim:

1. Electrical contact unit for electrically connecting a first main member, having a generally planar first supporting surface, with a second main member, having a generally planar second supporting surface, the second main member being mountable on the first main member, in which:

the first main member comprises a contact cradle, which exhibits a generally planar outer cradle surface and comprises first electrical contacts and a supporting member, which extends from the outer cradle surface;

the second main member comprises second electrical contacts and is provided with a receiving recess;

the contact cradle is rotatably journalled on a cradle axle;

the second main member assuming:

a first mounting position, in which the first supporting surface is parallel to and is located immediately adjacent to the second supporting surface, and the rolling/sliding member lies against the second supporting surface, the contact cradle thereby assuming a retracted position, in which none of the first electrical contacts is in physical contact with the second main member, and a second mounting position, in which the first supporting surface is parallel to and is located immediately adjacent to the second supporting surface, the supporting member being located in the receiving recess, the contact cradle thereby assuming a contact position, in which each of the first electrical contacts is in contact with a corresponding one of the second electrical contacts;

and in which the second main member moves from the first mounting position to the second mounting position and vice versa by the two main members being rotated relative to one another.

2. Electrical contact unit according to claim 1, comprising a cradle spring, pretensioned for urging the cradle into the contact position, and in which the contact cradle moves from the retracted position to the contact position and vice versa by rotation about the cradle axle.

3. Electrical contact unit according to claim 1, in which the first electrical contacts consist of pins.

4. Electrical contact unit according to claim 3, in which the pins are mounted in holes in the contact cradle and are provided with pin springs, each pin assuming a pressed in position and a protruding position, the pin springs being pretensioned for urging the pins into the protruding position.

5. Electrical contact unit according to claim 4, in which chosen ones of the pins extend, in the protruding position, farther out from the outer cradle surface than the others.

6. Electrical contact unit according to claim 1, in which the supporting element consists of a roller which is rotatably mounted on a roller axle.

7. Electrical contact unit according claim 6, in which the receiving recess is cylindrical and has a curvature which is less than the curvature of the roller, each of the pins, upon transition from the protruding position to the pressed in position, thereby contacting the corresponding second electrical contact immediately before the contact cradle assumes the contact position.

8. Electrical contact unit according to claim 1, in which the second main member is mounted on the first main member by means of a bayonet mount.

9. Electrical contact unit according to claim 8, in which the first main member is a camera housing and the second main member is a camera lens.

* * * * *